United States Patent

[11] 3,612,810

[72] Inventor Thomas J. O'Connor
 100 Morgan Road, Ann Arbor, Mich. 48104
[21] Appl. No. 887,795
[22] Filed Dec. 23, 1969
[45] Patented Oct. 12, 1971
 Continuation-in-part of application Ser. No. 696,195, Jan. 8, 1968, now Patent No. 3,485,991, dated Dec. 23, 1969, which is a continuation-in-part of application Ser. No. 504,971, Oct. 24, 1965, now Patent No. 3,363,083, dated Jan. 9, 1968, which is a continuation-in-part of application Ser. No. 250,321, Jan. 9, 1963, now Patent No. 3,222,494, dated Dec. 7, 1965.

[54] MOVABLE DIELECTRIC TANK FOR ELECTROEROSIVE MACHINES
 8 Claims, 7 Drawing Figs.
[52] U.S. Cl. ................................................. 219/69 G,
  204/143 M, 219/69 V
[51] Int. Cl. ....................................................... B23p 1/04,
  B23p 1/08
[50] Field of Search .......................................... 219/69 D,
  69 F, 69 V; 204/143 G, 143 M

[56] References Cited
UNITED STATES PATENTS
3,067,317 12/1962 Buro ............................. 219/69
3,390,244 6/1968 Webb ............................. 219/69

Primary Examiner—R. F. Staubly
Attorney—Whittemore, Hulbert & Belknap

ABSTRACT: A machine tool for electrical machining is disclosed including a ram portion for moving an electrode supported thereby transversely of a workpiece while moving the electrode toward the workpiece. The ram is moved toward the workpiece in the machine tool disclosed by a screw and nut mechanism driven by a rotary hydraulic motor.

The machine tool further includes a stationary table for supporting a workpiece and a movable dielectric work tank having an opening in the bottom thereof operable in conjunction with the table to provide a sealed tank in one position thereof and to permit rapid draining of dielectric through the bottom of the tank on downward movement of the tank relative to the table whereby the workpiece and table are exposed for inspection. A system is also disclosed for supplying clean dielectric to the work tank for pumping dielectric from the work tank to a storage tank and for pumping the dielectric from the storage tank through a filter back to the work tank or back to the storage tank. The dielectric system also includes a removable tray for receiving contaminated electrolyte to be cleaned or disposed of.

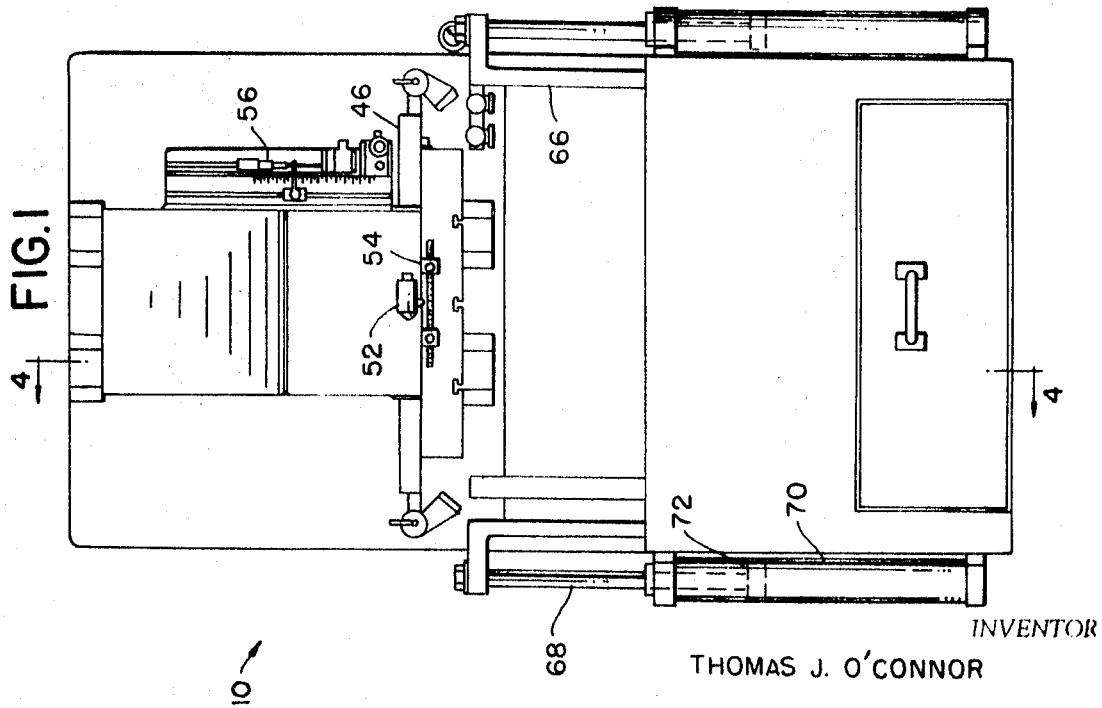

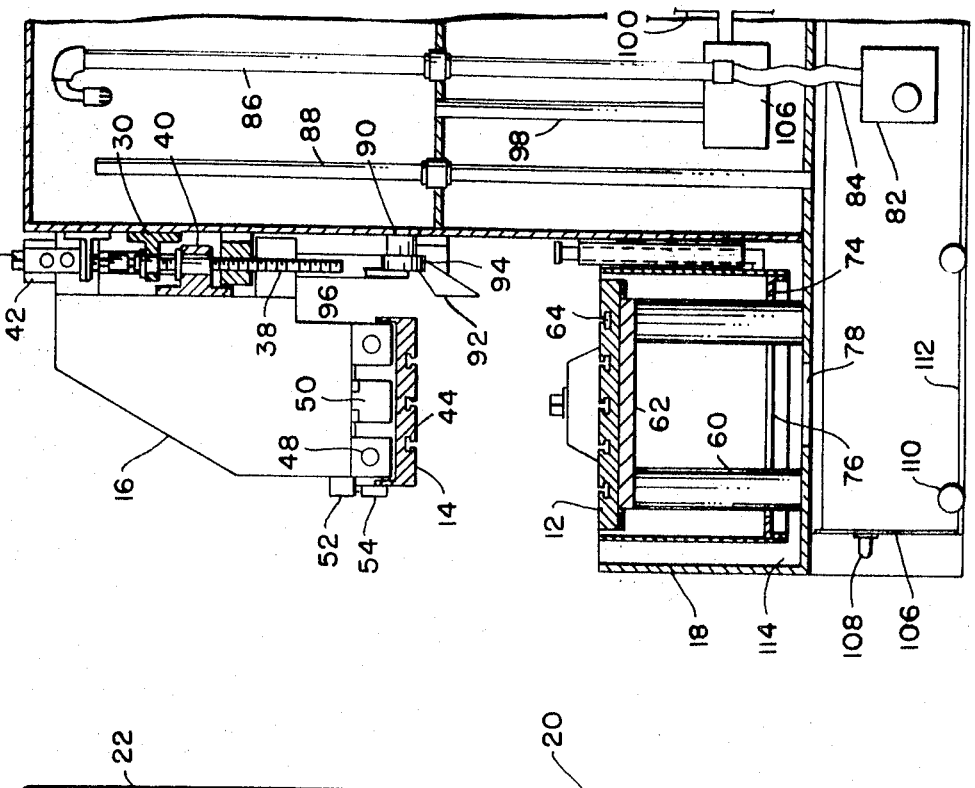
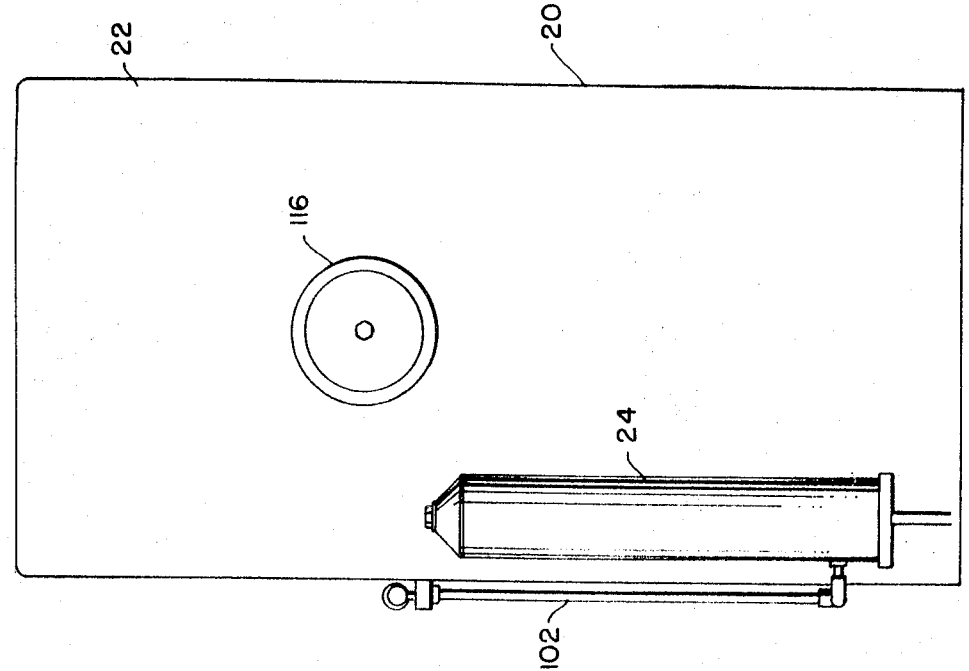

MOVABLE DIELECTRIC TANK FOR ELECTROEROSIVE MACHINES

CROSS-REFERENCE TO RELATED APPLICATIONS

This application is a continuation-in-part of application Ser. No. 696,195, filed Jan. 8. 1968, now U.S. Pat. No. 3,485,991, which is a continuation-in-part of application Ser. No. 504,971, now U.S. Pat. No. 3,363,083, which is a continuation-in-part of application Ser. No. 250,321, now U.S. Pat. No. 3,222,494.

BACKGROUND OF THE INVENTION

1. Field of the Invention

The invention relates to electrical machining of conductive workpieces and refers equally as well to electrical discharge machining as to electrochemical machining. More specifically the invention is concerned with the machine tool portion of electrical machining apparatus, including structure for transversely reciprocating an electrode as it is moved toward a workpiece, screw and nut mechanism driven by a rotary hydraulic motor for moving the electrode toward a workpiece, a stationary worktable, a dielectric work tank movable relative to the table to seal the tank or rapidly discharge dielectric fluid therefrom and a unique dielectric transfer and cleaning system.

2. Description of the Prior Art

In the past electrical machining has generally been accomplished in stationary dielectric tanks secured to a machine bed for supporting a workpiece. Prior machine tools for electrical machining have normally included ram structure for moving an electrode into and out of engagement with a workpiece to be machined in only one direction with transverse movement of the electrode being generally considered undesirable.

In addition, in prior machine tool structures for electrical machining the ram has generally been moved by servo means including a circuit for sensing the voltage between an electrode and workpiece, driving an electrohydraulic servo valve which in turn has moved a hydraulic piston connected to the ram. Alternatively, gear trains have been used in conjunction with electric motors for moving the ram toward and away from the workpiece in prior machine tools for electrical machining.

In addition, with prior machine tools, the dielectric system has generally included a separate dielectric storage tank from which dielectric fluid has been pumped into the dielectric tank in which the workpiece is placed and from which the fluid has been pumped back to the storage tank with filter means being positioned between the pump and tank in which the workpiece is positioned. With such prior systems no means for dumping fluid directly from the work tank in which the workpiece is positioned to an additional storage tank prior to pumping through a filter for reuse or into a still further storage tank has been provided.

SUMMARY OF THE INVENTION

In accordance with the invention there is provided a machine tool for use in conjunction with a power supply and servo system to effect electrical machining, including screw and nut means driven by a rotary hydraulic motor for moving the ram of the machine tool toward and away from a workpiece. A ram portion is provided on the machine tool for reciprocating the electrode transversely to the direction of movement of the ram toward and away from the workpiece and simultaneously therewith to provide faster, better and more economical electrical machining more efficiently. The method of machining, including reciprocating the electrode transversely of the direction of movement thereof toward a workpiece during machining is also part of the invention.

The invention further includes providing a dielectric system including a dielectric tank operable in conjunction with a fixed machine tool table for maintaining dielectric about a workpiece secured to the table and for rapidly draining the dielectric through the bottom of the tank when draining of the dielectric tank is desired. A tray for receiving the dielectric drained through the bottom of the dielectric tank is also provided to receive contaminated dielectric for cleaning or disposal. The dielectric system also includes a tank for storing dielectric, means for pumping dielectric from the tray into the storage tank and for pumping dielectric from the storage tank through a filter to the work tank and for passing the dielectric fluid from the storage tank directly to the work tank.

BRIEF DESCRIPTION OF THE DRAWINGS

FIG. 1 is a front elevation view of a machine tool for electrical machining constructed in accordance with the invention.

FIG. 2 is a side elevation view of the machine tool illustrated in FIG. 1, taken in the direction of arrow 2 in FIG. 1.

FIG. 3 is a rear elevation view of the machine tool illustrated in FIG. 1, taken in the direction of arrow 3 in FIG. 2.

FIG. 4 is a partially broken away section view of the machine tool illustrated in FIG. 1, taken substantially on the line 4—4 in FIG. 1.

DESCRIPTION OF THE PREFERRED EMBODIMENT

Figure 5:
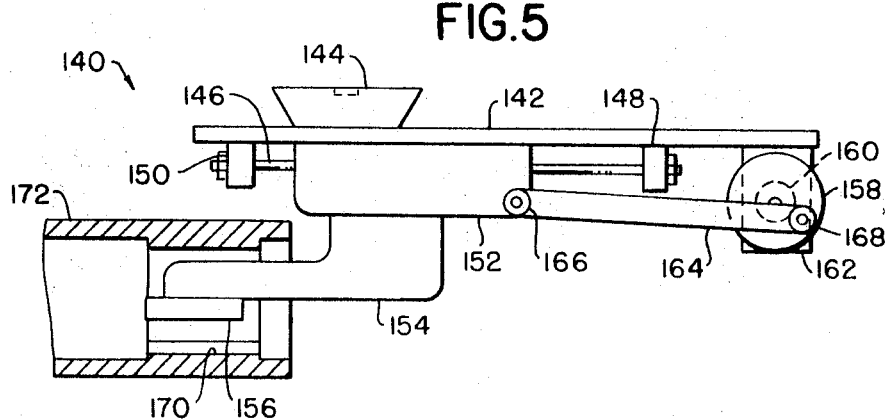
FIG. 5 is an elevation view of a quick-change tool constructed in accordance with the invention.

The machine tool 10 illustrated in FIGS. 1 through 4 is intended for use with an electrical discharge power supply for supplying machining energy between a workpiece and an electrode secured thereto and an electrical servo circuit for sensing a voltage across a gap between the workpiece and an electrode to effect relative movement between the electrode and workpiece and thereby maintain a predetermined spark gap therebetween. Electrical discharge machining apparatus including power supplies and servo circuits are well known, as indicated in U.S. Pat. No. 3,222,494 and the references cited therein. The power supply and servo circuit to be used with the machine tool 10 will not therefore be considered in detail herein.

The machine tool 10 includes the base 20 having storage tank portion 22 on which the ram 16, ram drive structure 17, table 12, work tank 18 and filter system 24 are positioned, as shown in the figures of the drawings. In particular, the work tank 18 is supported by piston and cylinder structures 26 secured to the base 20 by brackets 28, and the filter system 24 is secured to the base 20 by brackets 28, and the filter system 24 is secured to the base 20 by convenient means, such as bracket 30. Ram 26 is mounted for vertical reciprocation on rods 32 connected to the tank portion 22 of the base 20 by means of the brackets 34. Ram drive structure 17 is secured to base 20 by brackets 36 to ram 16 by nut 40.

Ram 16 is movable vertically on the shafts 32 on rotation of hydraulic motor 42 to rotate screw 38 in nut 40. Rotary hydraulic motor 42 is connected to be driven by hydraulic servo structure (not shown) to provide particularly simple, economical and efficient movement of ram 16. The hydraulic servo structure may, for example, include an electrohydraulic servo valve and means for sensing the voltage between an electrode and a workpiece positioned on the machine tool 10 in the usual manner.

The portion 14 of the ram 16 is considered in particular detail in applicant's above referenced copending application, Ser. No. 696,195, now U.S. Pat. No. 3,485,991, and includes an electrode receiving slide 44 to which electrodes may be secured by means of T-slots therein, a guide 46 mounted in a stationary position with respect to the remainder of the ram 16, a pair of rods 48 secured to guide 46 on which the slide 44 is reciprocally movable with respect to the guide 46 and hydraulic piston and cylinder drive means 50 secured to the slide and guide and operable to reverse directions of movement of the slide relative to the guide on tripping of the limit switch 52 mounted on the guide by the cam structure 54 mounted on the slide. Thus, it will be seen that the slide 44 may be reciprocated transversely of the ram 16 as the ram is moved toward or away from a workpiece positioned on the table 12.

Such reciprocation of an electrode during a machining operation results in faster stock removal than prior straight plunges minimum radiuses, and permits machining with an electrode not formed in the exact image of the machining to be accomplished. In addition, it appears that better flushing of dielectric is provided on reciprocation of the electrode during machining, that the machining provided by such structure has a better finish and eliminates projections formed by hollow electrodes. Also, the placing of flush holes is not critical with the electrode being reciprocated transversely of the direction of movement thereof toward the workpiece.

The reciprocation of an electrode while moving it toward a workpiece by the portion 14 of the ram 16 of machine tool 10 further permits redressing of electrodes by a dressing tool placed on the table of the machine tool 10.

As illustrated best in FIG. 4, the table 12 is supported on the base 20 by the posts 60 and the platform 62. The table 12 is provided with the usual T-slots 64 by which a workpiece may be secured in place on the table.

The work tank 18 in which dielectric fluid is maintained during machining of a workpiece positioned on the table 12 is supported by yoke members 66 secured at the lower end thereof to the tank 18 and at the upper end to the piston rods 68 of the piston and cylinder structures 26. The piston and cylinder structures 26 include the cylinders 70 and pistons 72 positioned therein for axial reciprocation. As shown best in FIG. 2, the tank 18 includes the peripheral flange 74 surrounding an opening 76 in the bottom thereof.

In operation, when the pistons 72 are caused to move up in the cylinders 70, the piston rods 68 are extended, as shown in FIGS. 1 and 2, whereby the tank 18 secured to the yokes 66 is moved from the lower position illustrated in FIG. 4 to an upper position. In the lower position illustrated in FIG. 4, dielectric fluid in the tank 18 has been drained around the table 12 through the opening 76 in the bottom of the tank 18 and subsequently through the opening 78 in the base 20. In the upper position of the tank 18 the flange 74 forms a tight connection with the seal 80 secured around the bottom of the table 12 to maintain dielectric fluid in the tank 18.

The dielectric system of the machine tool 10 includes the storage tank portion 22 of the base 20, a pump 82 positioned in dielectric tray 106 in base 20 connected by means of flexible tubing 84 to a stand pipe 86 emptying into the storage tank portion 22 of the work tank. An overflow pipe 88 is also provided in the storage tank portion 22 of the base 20 for returning overflow dielectric fluid pumped into the storage tank portion 22 back to the tray 106.

From the storage tank portion 22 of the base 20 dielectric fluid may be gravity fed directly into the work tank 18 through coupling 90 into the storage tank portion 22 and outlets 92 on opposite sides of the base 20 on actuation of valve means 94 as by levers 96. Alternatively the dielectric fluid from the storage tank portion 22 of the base 20 may be pumped through the conduit 98, filter 100 and conduit 102 back into the work tank 18 on opening of the valves 104 by pump 106 positioned in the base as shown best in FIG. 4.

The dielectric tray 106 provided in the base 20 includes a handle 108 and is mounted on rollers 110 guided on tracks 112 in the base 20 for movement into and out of the base 20. Thus, contaminated dielectric from the work tank 18 may be dumped from the tank 18 through the opening 76 in the bottom of the tank into the portion 114 of the base 20 and subsequently through the opening 78 in the base and into the tray 106. The tray 106 may then be removed and the dielectric either cleaned or thrown away.

The dielectric system, as thus disclosed, is particularly efficient in supplying a clean dielectric to the work tank 18 and in rapidly removing the dielectric from the tank 18 when removal thereof is so desired. It will also be noted that both the tray 106 and the storage tank portion 22 of the base 20 may be readily cleaned through removal of the tray 106 and the cleanout cover 116 of the storage tank portion 22, respectively.

Thus, in overall operation, a workpiece which it is desired to machine electrically is secured to the table 12 of the machine tool 10 and an electrode is secured to the slide 44 on the ram 16. The work tank 18 is moved into an upper position, whereby the opening 76 in the bottom thereof is sealed by the flange 74 abutting against the seal 80 on actuation of the piston and cylinder structures 26. Hydraulic fluid is pumped form the tank portion 22 of the base 20 into the work tank 18.

With the workpiece in position on the table 12 and the work tank in a raised position with dielectric fluid therein, the ram 16 may be advanced toward the workpiece on actuating the hydraulic rotary motor 42 to turn the screw 38. In the usual manner the motor 42 is rotated in accordance with a hydraulic signal from an electrohydraulic servo valve and a servo circuit sensing the voltage between an electrode secured to the slide 44 and a workpiece positioned on the table 13 of the machine tool 10. The rotary hydraulic motor 42 is reversible and provides particularly simple, economical and efficient driving of the ram 16 toward the workpiece to maintain a predetermined distance between the electrode and workpiece.

During electrical machining in conjunction with a power supply having terminals of opposite polarity connected to the workpiece and electrode through the machine tool 10 in the usual manner, the slide 44 is reciprocated on rods 48 transversely of the movement of the ram 16 toward the workpiece, as previously indicated, by the reversible piston and cylinder structure 50, the limits of which reciprocation is determined by the cams 54 and the limit switch 52. Reciprocation of the electrode in contact with the workpiece transversely of the direction of movement of the electrode toward the workpiece produces faster stock removal and gives better dielectric flushing, whereby better finish, lower tolerances and smaller radiuses are possible.

During machining of the workpiece the level of dielectric fluid in tank 18 may be maintained by stand pipe 112 secured to tank 18 for movement therewith and having shield 114 therearound to return dielectric to tray 106 without splashing. When the machining of the workpiece is completed, the dielectric may be drained from the tank 18 through stand pipe 112 and back to the tray 106. Alternatively, the work tank 18 may be lowered, whereby dielectric is spilled through the bottom opening 76 of the tank 18 and through the opening 78 in the base 20 into the tray 106, from which it may be removed and decontaminated if necessary, and subsequently returned to the machine tool 10. Lowering of the tank 18 provides ready visual inspection of the workpiece without the necessity of removing the workpiece form the machine tool 10 or removing a portion of the tank 18.

Figure 6:
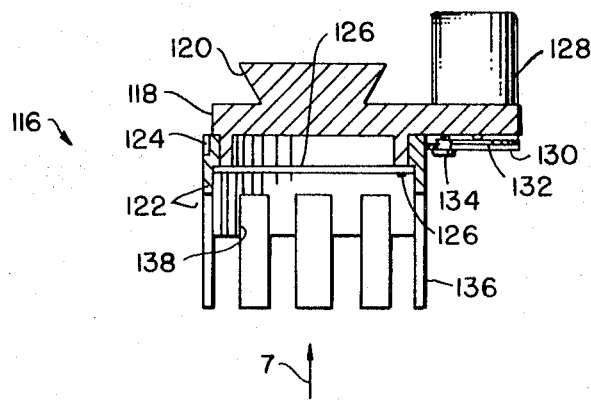
FIG. 6 is a longitudinal section view of another embodiment of a quick-change tool constructed in accordance with the invention taken substantially on the line 6—6 in FIG. 7.
Figure 7:
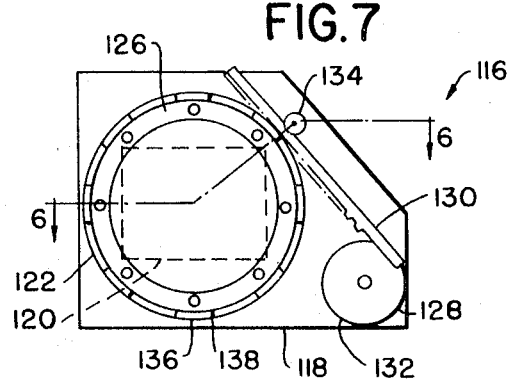
FIG. 7 is a bottom view of the quick-change tool structure illustrated in FIG. 6 taken in the direction of arrow 7 in FIG. 6.

While the portion 14 of the ram 16 has been considered as an integral part of the ram herein, it will be understood that the portion 14 of the ram 16 may be a dovetail quick-change tool as particularly illustrated in copending application Ser. No. 696,195 . Further, it will be understood that other quick-change tools such as illustrated particularly in FIGS. 5 through 7 may be substituted for the particular portion 14 of the ram 16 by placing a dovetail platen on the end of the ram 16 rather than the portion 14 of the ram 16.

The quick-change tool 116 illustrated in FIGS. 7 and 8 again includes a base plate 118 having a dovetail portion 120 by which the tool 116 may be rapidly and accurately secured to the dovetail platen 30 of the electrical machining apparatus mechanical section 12. An electrode mounting cylinder 122 having an external gear portion 124 is reciprocally mounted on the base plate 118 by means of the annular member 126 which may be bolted to the base plate 118.

The cylindrical member 122 is reciprocated angularly by means of the motor 128 mounted on the base plate 118 and rack 130 pivoted at one end to the disc 132 driven by the motor 128 and in engagement with the gear portion 124 of the cylindrical member 122 adjacent the other end thereof. The rack 130 is held in engagement with the gear portion 124 by the post 134 which allows slight radial movement of the rack 130 to prevent binding thereof. The electrodes 136 secured to the end of the cylindrical member 122 opposite from the baseplate have the same curvature as the cylindrical member 122 and are secured to the cylindrical member 122 by convenient means, such as for example tongue and groove structure operable between the electrode shanks and the openings 138 in the cylindrical member for receiving the electrodes. Thus, in operation, a complete thin circular groove may be machined on reciprocation of the cylindrical member while moving the tool 116 in a direction to feed the electrode 136 into a workpiece without the necessity of the difficult machining of a complete thin walled cylindrical electrode.

The quick-change tool 140 illustrated in FIG. 9 again includes the base plate 142 having a dovetail portion 144 extending from one side thereof by which the tool may be secured to the platen 30. Guide rods 146 are rigidly secured to the baseplate 142 by convenient means, such as the brackets 148 and bolts 150. A slide 152 is reciprocally mounted on the guide shafts 146 and supports the electrode mounting member 154 to which the electrode 156 is attached by convenient means, such as bolts (not shown).

The slide 152 is reciprocated on the guide shafts 146 on rotation of disc 158 by means of the servomotor 160 carried by the bracket 162 attached to the base plate 142 through the connecting link 164 pivoted at end 166 to the slide 152 and at end to the disc 158. In use, the tool 140 permits machining of internal slots 170 in tubular workpiece 172 at a faster rate and with a smaller electrode and less electrode wear than possible without reciprocation of the electrode 156 transversely of the direction of movement of the electrode toward the slot 170.

While one embodiment of the present invention has been disclosed in detail together with the plurality of modifications thereof, it will be understood that other embodiments and modifications of the invention are contemplated. It is the intention to include all embodiments and modifications of the invention as are defined by the appended claims within the scope of the invention.

1. Machine tool structure for electrical machining comprising a base, a worktable secured to the base for receiving a workpiece to be machined having a peripheral seal around the bottom thereof, a dielectric tank mounted on the base having an opening in the bottom thereof and including a flange surrounding the opening for maintaining dielectric fluid surrounding the workpiece on the table in conjunction with the table, and means for relatively moving the tank and table to provide ready inspection of the workpiece on the table including means for moving the tank to seal the flange against the periphery of the table in one position thereof and to expose a workpiece on the table and spill dielectric through the opening in the bottom of the tank in the other position thereof.

2. Structure as set forth in claim 1, and further including a removable tray positioned in the base beneath the tank and an opening in the base through which dielectric fluid spilled through the bottom of the tank is passed into the removable tray.

3. Machine tool structure for electrical machining comprising a base, a worktable secured to the base for receiving a workpiece to be machined, a dielectric tank mounted on the base having an opening therethrough in peripheral engagement with the table for maintaining dielectric fluid surrounding the workpiece on the table in conjunction with the table, and means for relatively moving the tank and table to spill dielectric through the opening in the tank and provide ready inspection of a workpiece on the table.

4. Structure as set forth in claim 3 wherein the means for relatively moving the tank and table move the tank and table vertically relative to each other.

5. Structure as set forth in claim 3 wherein the means for relatively moving the tank and table include a hydraulic piston and cylinder structure connected between the tank and table.

6. Structure as set forth in claim 5 wherein the hydraulic piston and cylinder structure includes a cylinder at each side of the tank secured to the base and a piston movable within the cylinder at each side of the tank connected to the tank for movement therewith.

7. Structure as set forth in claim 3 wherein the means for relatively moving the tank and table is operable to lower the tank with respect to the table.

8. Structure as set forth in claim 3 wherein the opening in the tank is in the bottom thereof.